US010094441B2

(12) United States Patent
Abensur et al.

(10) Patent No.: US 10,094,441 B2
(45) Date of Patent: Oct. 9, 2018

(54) ELECTRIC JACK COMPRISING STRESS-LIMITING MEANS AND SPACE LAUNCHER COMPRISING A NOZZLE SUPPORTED BY SUCH A JACK

(71) Applicant: Astrium Sas, Suresnes (FR)

(72) Inventors: Thierry Abensur, Poissy (FR); Gérald Pignie, Rambouillet (FR); Alizée Vergnol, Paris (FR); Susana Perez-Diago, Verneuil sur Seine (FR)

(73) Assignee: ASTRIUM SAS, Suresnes (FR)

( * ) Notice: Subject to any disclaimer, the term of this patent is extended or adjusted under 35 U.S.C. 154(b) by 1104 days.

(21) Appl. No.: 14/351,584

(22) PCT Filed: Oct. 22, 2012

(86) PCT No.: PCT/EP2012/070862
§ 371 (c)(1),
(2) Date: Apr. 14, 2014

(87) PCT Pub. No.: WO2013/060642
PCT Pub. Date: May 2, 2013

(65) Prior Publication Data
US 2014/0238794 A1 Aug. 28, 2014

(30) Foreign Application Priority Data

Oct. 24, 2011 (FR) ...................................... 11 59610

(51) Int. Cl.
*F16F 9/00* (2006.01)
*F16F 9/30* (2006.01)
(Continued)

(52) U.S. Cl.
CPC ................ *F16F 9/006* (2013.01); *B64G 1/40* (2013.01); *F16F 9/003* (2013.01); *F16F 9/30* (2013.01); *F16F 15/02* (2013.01)

(58) Field of Classification Search
CPC .... F16F 9/006; F16F 9/003; F16F 9/30; F16F 15/02; F16F 2224/04; F16F 9/465; B64G 1/40; B64G 2700/24; B64C 27/001
See application file for complete search history.

(56) References Cited

U.S. PATENT DOCUMENTS 4,535,977 A * 8/1985 Strong ................... B60G 15/00
188/269
6,052,992 A 4/2000 Eroshenko
(Continued)

FOREIGN PATENT DOCUMENTS

DE 10 2007 004 445 A1 8/2008
JP 2003-521646 A 7/2003
(Continued)

OTHER PUBLICATIONS

International Search Report issued in Application No. PCT/EP2012/070862 dated Dec. 6, 2012.
(Continued)

*Primary Examiner* — Magdalena Topolski
(74) *Attorney, Agent, or Firm* — Pearne & Gordon LLP

(57) ABSTRACT

An electromechanical actuator (10), comprising a movable member (14) provided with connecting means (20) and translationally movable with respect to a frame (12), and an energy absorbing-dissipating structure (28, 30) located on a strain path between said connecting means (20) and said frame (12) and comprising a porous capillary matrix (40) having an apparent porosity and an associated liquid (42) having a wetting angle higher than 90 degrees relative to said matrix (40) and selected such that part of said liquid (42) penetrates the pores of said matrix (40), when said chamber is subjected to a pressure equal to or higher than a first pressure level P1, and is spontaneously rejected off the pores of said matrix (40) by capillary action, when said
(Continued)

structure is subjected to a pressure lower than a second pressure level P2 itself lower than said first pressure level P1.

13 Claims, 3 Drawing Sheets

(51) Int. Cl.
*F16F 15/02* (2006.01)
*B64G 1/40* (2006.01)

(56) References Cited

U.S. PATENT DOCUMENTS

| | | |
|---|---|---|
| 2003/0010587 A1* | 1/2003 | Eroshenko .............. F16F 9/003 188/314 |
| 2004/0084265 A1 | 5/2004 | Muller |
| 2009/0044645 A1 | 2/2009 | Buescher |
| 2010/0193305 A1 | 8/2010 | Suciu |
| 2017/0335916 A1* | 11/2017 | Fox ....................... F16F 7/1028 |

FOREIGN PATENT DOCUMENTS

| | | |
|---|---|---|
| JP | 2010-185577 A | 8/2010 |
| JP | 2011-084197 A | 4/2011 |
| WO | 96/18040 A1 | 6/1996 |
| WO | 9618040 A1 | 6/1996 |

OTHER PUBLICATIONS

Written Opinion issued in Application No. PCT/EP2012/070862 dated Dec. 6, 2012.

* cited by examiner

ELECTRIC JACK COMPRISING STRESS-LIMITING MEANS AND SPACE LAUNCHER COMPRISING A NOZZLE SUPPORTED BY SUCH A JACK

TECHNICAL FIELD

The present invention generally relates to the field of electric actuators.

It more particularly but not exclusively relates to an electric actuator for steering a jet nozzle equipping an engine of a space launcher.

STATE OF PRIOR ART

Engines of space launchers include a steerable jet nozzle for channelling gases from the combustion chamber of these engines and enabling the jet of these gases and thus the thrust produced by these gases to be steered in order to control the trajectory of the space launcher.

The nozzle of a space launcher engine is generally supported by steering actuators attached to the engine, which are usually two.

Upon starting the engine, or upon a cut-off thereof in case of an aborted launch, the pressure field inside the engine is not axisymmetric during a short time span, in the order of a few seconds, which induces a torque exerted onto the engine and thus relatively intense strains onto the steering actuators of the nozzle thereof.

Since the maximum level these strains are likely to reach is not predictable with a good accuracy, the actuators have to be oversized to meet security requirements, which is detrimental in terms of weight and cost.

Furthermore, the use of hydraulic actuators causes relatively high pre-flight implementation costs, such that it would be desirable to be able to substitute them for electromechanical actuators, which are less expensive to implement. Furthermore, there are currently sufficiently compact and light electric power supplies for this type of application.

However, electromechanical actuators have to be widely oversized to withstand this type of transitory strains and may further have seizure risks, which makes this solution rather uninteresting.

There is thus a need for a new type of electromechanical actuator which is relatively compact and light while being capable of resisting relatively intense mechanical strains.

DISCLOSURE OF THE INVENTION

The purpose of the invention in particular is to provide a simple, economic and efficient solution to this problem.

One particular object thereof is to provide an electromechanical actuator capable of undergoing strains of a relatively high level, such as those which are likely to be transmitted by the nozzle of a space launcher engine to the steering actuators of this nozzle when the engine is operating on the ground, in particular during the starting and cut-off phases.

To that end, the invention provides an electromechanical actuator, for moving a first element with respect to a second element, and comprising a movable member provided with connecting means for being attached to said first element, and a frame provided with attaching means for being attached to said second element, the movable member being translationally movable with respect to the frame.

According to the invention, the actuator further comprises at least one mechanical energy absorbing-dissipating structure located on a strain path between said first element and the frame of the actuator, and comprising a deformable chamber containing at least one porous capillary matrix having open pores and an associated liquid having a wetting angle higher than 90 degrees relative to said matrix and selected such that at least part of said liquid penetrates the pores of the matrix, when the chamber is subjected to an external mechanical pressure equal to or higher than a first pressure level, and is spontaneously rejected off the pores of the matrix by capillary action, when the chamber is subjected to an external mechanical pressure lower than a second pressure level which is itself lower than said first pressure level.

Exemplary mechanical energy absorbing-dissipating structures of this type are described in greater detail in patent application WO 96/18040.

Generally, energy absorbing-dissipating structures of this type take advantage of the surface tension of the liquid at the interface with the material which makes up the abovementioned porous capillary matrix and which is lyophobic towards said liquid. They more particularly take advantage of the fact that the wetting surface, that is the separating surface between liquid and solid, increases during the liquid intrusion into the pores of the matrix and decreases during the liquid extrusion off the pores of this matrix such that energy is built up in the structure during the liquid intrusion and is released therefrom during the liquid extrusion.

In this type of structures, the liquid intrusion is made at a substantially constant pressure as soon as the pressure applied to the deformable chamber exceeds a pressure threshold corresponding to the first aforementioned pressure level, and the liquid extrusion is also made at a substantially constant pressure as soon as the pressure applied to the deformable chamber becomes again lower than the aforesaid second pressure level, as will be more clearly apparent in the following.

Both abovementioned pressure levels, which respectively correspond to the start of liquid intrusion into the pores of the porous capillary matrix and liquid extrusion off these pores, are determined by selecting the liquid and selecting the material making up the porous capillary matrix as well as by the shape of the pores thereof. It is worthy of note that the aforementioned first pressure level is substantially equal to the capillary Laplace pressure given by the formula $P=(2\sigma \cdot \cos \theta)/r$, where $\sigma$ is the surface tension of the liquid at the temperature considered, $\theta$ is the contact or wetting angle, and $r$ is the radius of the capillary channel formed by the pore of the porous capillary matrix.

The energy absorbing-dissipating structure may have an especially strong hysteresis as the difference between both aforementioned pressure levels is great.

The material making up the porous capillary matrix can for example be selected from silicates, for example from zeolites. This material can also be silica gel, sometimes called Silicagel. The associated liquid can for example be water or a gallium, indium and tin alloy called Galinstan. Other exemplary materials for the matrix and associated liquids are known from the aforementioned document WO 96/18040.

Generally the material forming the porous capillary matrix can be intrinsically lyophobic towards the associated liquid or this matrix can be covered with a treatment for making it lyophobic.

Besides, the capillary matrix is preferably made of lyophobic grains or beads having a micrometric diameter and nanometric pores. The capillary matrix can also assume the form of a powder made of grains or a gel made of beads.

The association of the porous capillary matrix and associated liquid forms a colloid, also called "lyophobic heterogeneous system", which makes up the aforementioned energy absorbing-dissipating structure.

The colloid can be directly provided in said deformable chamber.

Alternatively, the colloid can be contained in one or more pouches provided in the deformable chamber, preferably dipped in a fluid such as oil contained in this deformable chamber.

Generally, the energy absorbing-dissipating structure enables the level of strains likely to be transmitted to the frame of the actuator by the first abovementioned element via the movable member of the actuator to be restricted. Indeed, when such strains result in the aforementioned first pressure level being reached, the energy resulting from these strains is stored in the structure during the liquid intrusion into the pores of the porous capillary matrix such that strains of a level higher than said first pressure level are not likely to be transmitted to the frame of the actuator.

When the actuator according to the invention is used for steering a space launcher engine nozzle, in which case the aforementioned first element is said nozzle and the aforementioned second element is a fixed element of a space launcher engine, this actuator can then be dimensioned so as to support the strain levels that can nominally occur during a flight in this type of application, and not to support the level of transitory strains of starting and cutting off the engine, which can be much higher.

The invention thus enables to avoid resorting to oversized electromechanical actuators so as to support randomly occurring high transitory strains, and thus enables the use of electromechanical actuators having relatively reasonable dimensions and weight.

The frame of the actuator advantageously takes the form of a cylinder, and the movable member of this actuator advantageously takes the form of a rod.

Alternatively, other shapings of the frame and/or movable member are however possible without departing from the scope of the present invention.

Further, the energy absorbing-dissipating structure can comprise several porous capillary matrices made up of different materials and associated with a same liquid or different respective liquids. The different colloids thus formed are preferably contained in distinct deformable chambers.

Preferentially, each energy absorbing-dissipating structure of the actuator is accommodated inside a cavity through which at least part of the movable member of the actuator passes and is interposed between a wall of this cavity and strain transmitting means which are likely to exert a pressure against the deformable chamber of said energy absorbing-dissipating structure to transmit strains between the aforementioned first element and the frame of the actuator.

The deformable chamber of each energy absorbing-dissipating structure is advantageously bounded, inside said cavity, by a sealing element which is for example formed by a stopper which is slidingly sealingly mounted inside the cavity according to a cylinder-piston principle.

Alternatively, the sealing element can take the form of a deformable bellows.

Furthermore, each energy absorbing-dissipating structure of the actuator is preferably arranged in a bottom of said cavity.

In first and second embodiments of the invention, the strain transmitting means are carried by the movable member of the actuator. These strain transmitting means are thus integral with this movable member.

In the first embodiment of the invention, said connecting means of the movable member for connection to said first element comprise a hollow body slidingly mounted on the movable member and inside which the aforementioned cavity is provided.

Thus, each energy absorbing-dissipating structure enables the level of strains transmitted by said first element to the frame of the actuator through the movable member of this actuator be permanently restricted, regardless of the stroke of this movable member with respect to the frame of the actuator.

In this first embodiment of the invention, the strain transmitting means preferably take the form of a plate, for example having a cylindrical shape.

Furthermore, the movable member of the actuator is advantageously controlled by a driving unit integral with the frame of the actuator.

In the second embodiment of the invention, the frame of the actuator comprises a hollow body inside which said cavity is provided, and a driving unit of the movable member of the actuator is fixedly accommodated in this cavity.

In this case, each energy absorbing-dissipating structure of the actuator is thus accommodated inside the hollow body of the frame.

Each energy absorbing-dissipating structure of the actuator is then preferably provided so as to be able to be biased by the strain transmitting means when the movable member of the actuator is at the end of its stroke.

In a third embodiment of the invention, the frame of the actuator comprises a hollow body inside which said cavity is provided, and the strain transmitting means aid in supporting a driving unit for driving the movable member of the actuator into this cavity.

In this case, as in the abovementioned first embodiment, each energy absorbing-dissipating structure of the actuator is likely to be biased and thus to restrict the strains transmitted to the frame of the actuator regardless of the stroke of the movable member of the actuator.

In the aforementioned second and third embodiments, the strain transmitting means preferably comprise one or more plates respectively associated with each energy absorbing-dissipating structure and each arranged between said driving unit and said associated energy absorbing-dissipating structure.

Generally, the electromechanical actuator advantageously comprises two mechanical energy absorbing-dissipating structures each located on a respective strain path between said first element and the frame of the actuator and each comprising a deformable chamber containing at least one porous capillary matrix having open pores and an associated liquid having a wetting angle higher than 90 degrees relative to said matrix and selected such that at least part of said liquid penetrates the pores of the matrix, when said chamber is subjected to an external mechanical pressure equal to or higher than a first pressure level, and is spontaneously rejected off the pores of the matrix, when said chamber is subjected to an external mechanical pressure lower than a second pressure level, which is lower than said first pressure level, said energy absorbing-dissipating structures being provided on either side of said strain transmitting means such that said first element can bias these structures in two respective opposite directions.

The invention also relates to an engine for a space launcher, including at least one jet nozzle, as well as at least one electromechanical actuator of the type described above to provide the support and steering of this jet nozzle.

In a known manner per se, the number of actuators providing the steering of the abovementioned jet nozzle is for example equal to two. Two actuators can indeed be sufficient to provide the steering of such a nozzle.

The invention also relates to a stage for a space launcher, comprising at least one engine of the type described above.

The invention further relates to a space launcher, comprising at least one stage of the type described above.

BRIEF DESCRIPTION OF THE DRAWINGS

The invention will be better understood, and further details thereof will appear upon reading the following description, made by way of non-limiting example and in reference to the appending drawings wherein.

In all the figures, identical references can designate identical or analogous elements.

DETAILED DISCLOSURE OF PREFERRED EMBODIMENTS

Figure 1:
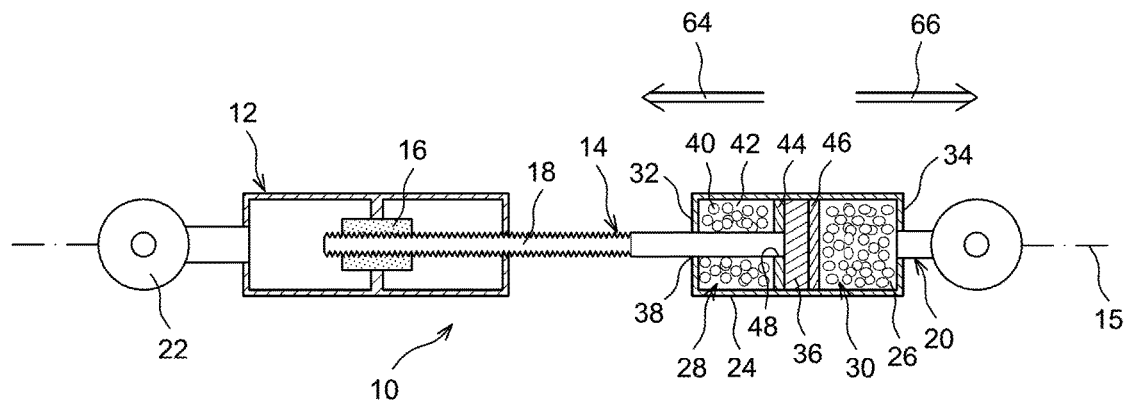
FIG. 1 is a schematic axial cross-section view of an electromechanical actuator according to a first embodiment of the invention.

FIG. 1 represents an electromechanical actuator 10 comprising a frame 12, a movable member 14 generally in the form of a rod and translationally movable with respect to the frame 12 along a longitudinal axis 15 of the actuator, as well as a driving unit 16, accommodated inside the frame 12 and being integral with the same, and for driving the movable member 14.

The driving unit 16 is of a conventional type and includes for example means cooperating with a threaded part 18 of the movable member 14 so as to form a ball bearing screw-nut mechanism to allow a position control of the movable member 14.

The movable member 14 is provided with connecting means 20 intended to be attached to a first element that the actuator 10 aims at driving with respect to a second element, wherein the first and second elements are not illustrated in the figures. The frame 12 includes attaching means 22 for attaching this frame 12 to the aforementioned second element.

In the first embodiment of the invention represented in FIG. 1, the connecting means 20 carried by the movable member 14 comprise an elongated shape hollow body 24 extending parallel to a longitudinal axis 15 of the actuator 10 and defining a cavity 26, as well as two energy absorbing-dissipating structures 28 and 30 respectively provided in contact with two opposite bottoms 32 and 34 of the cavity 26 for restricting the transmission of longitudinal strains to the movable member 14, as will be more clearly apparent in the following.

The movable member 14 includes an end head 36, taking the form of a plate, which is slidingly mounted inside the cavity 26 and is interposed between both aforementioned energy absorbing-dissipating structures 28 and 30. This end head 36 forms a strain transmitting means, as will be clearer in the following.

The movable member 14 passes through one 28 of the energy absorbing-dissipating structures, which is provided on the frame 12 side of the actuator, as well as a conjugate shaped port 38 formed in the corresponding bottom 32 of the cavity 26.

Each of the energy absorbing-dissipating structures 28 and 30 includes a powder formed by a plurality of grains 40 having a porous structure having open pores, as well as an associated liquid 42 towards which the grains 40 are lyophobic, in the sense that the liquid 42 has a wetting angle higher than 90 degrees relative to these grains 40.

The powder made up of the grains 40 is a porous capillary matrix in the terminology of the present invention. This powder and the liquid 42 form a colloid.

The colloid of each energy absorbing-dissipating structure 28, 30 is enclosed in a deformable chamber of said structure, which is defined inside the cavity 26 of the hollow body 24 by being bounded by this hollow body 24 together with a sealing element 44, 46 accommodated in this hollow body 24 by being interposed between said structure 28, 30 and the end head 36 of the movable member 14. The sealing element 44 of the energy absorbing-dissipating structure 28, which is provided on the movable member 14 side, includes at least one port 48 through which the movable member 14 sealingly passes.

Generally, for each of the energy absorbing-dissipating structures 28 and 30, the liquid 42 is selected such that at least part of this liquid penetrates the pores of the grains 40, when the head 36 of the movable member 14 subjects the deformable chamber of said energy absorbing-dissipating structure to a mechanical pressure equal to or higher than a first pressure level P1, and is spontaneously rejected off these pores by capillary action and kept off the pores, when the head 36 of the movable member 14 subjects the deformable chamber of the energy absorbing-dissipating structure to a mechanical pressure lower than a second pressure level P2 which is lower than said first pressure level P1.

To that end, the grains 40 can be made of a natural or synthetic hydrophobic material, for example from the zeolite family, whereas the associated liquid 42 is for example made up of water.

It is worthy of note that the aforementioned first pressure level P1 is substantially equal to the capillary Laplace pressure, as explained above.

In the example represented in FIG. 1, each sealing element 44, 46 has the form of a simple stopper slidingly sealingly mounted in the cavity 26 of the hollow body 24 by use of the cylinder-piston principle, so as to be able to be biased along the longitudinal direction by the end head 36 of the movable member 14 and then to be able to compress the assembly formed by the beads 40 and the associated liquid 42. In this case, each sealing element 44, 46 forms a sliding sealing joint.

Alternatively, other shapings of sealing elements are possible within the scope of the present invention to bound the deformable chamber of each energy absorbing-dissipating structure 28, 30.

Figure 2:
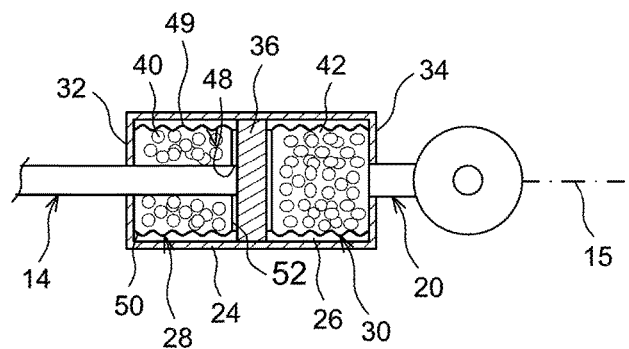
FIG. 2 is a schematic partial axial cross-section view illustrating an alternative embodiment of the actuator of FIG. 1.

Each sealing element can for example take the form of a bellows 49 of the type illustrated in FIG. 2, including an open end 50 fixedly connected to the corresponding bottom 32, 34 of the cavity 26, as well as a wall 52 for closing its opposite end, for example planar shaped and extending parallel to the aforementioned bottom 32, 34.

In this case, a pressure exerted by the end head 36 onto the closing wall 52 of one of the bellows 49 is likely to induce compressing of these bellows 49 and thus the deformable chamber bounded by the same and the assembly formed by the grains 40 and the associated liquid 42 contained in said chamber.

In operation, the energy absorbing-dissipating structures 28 and 30 of the connecting means 20 enable the longitudinal strains to be restricted, which are transmitted by these connecting means 20 to the frame 12 of the actuator 10, at a level substantially equal to the first pressure level P1.

Indeed, when the pressure applied by the end head 36 of the movable member 14 onto the sealing element 44, 46 of one of the energy absorbing-dissipating structures 28, 30 is lower than the first pressure level P1, this energy absorbing-dissipating structure behaves substantially as an incompressible structure.

On the other hand, as soon as this pressure reaches the first pressure level P1, the liquid 42 penetrates the pores of the grains 40, which results in an energy storage in this energy absorbing-dissipating structure. During this phase, the pressure applied by the end head 36 of the movable member 14 onto said sealing element 44, 46 remains substantially constant.

When this pressure becomes lower than the aforementioned second pressure level P2, which is lower than the first pressure level P1, the liquid 42 is spontaneously rejected off the pores of the grains 40 by capillary action, such that at least part of the energy previously stored in the energy absorbing-dissipating structure is restored to the movable member 14, but at a pressure lower than the first pressure level P1.

Finally, the longitudinal strains transmitted by the connecting means 20 to the movable member 14 are thus actually restricted to the aforementioned first pressure level P1.

Figure 3:
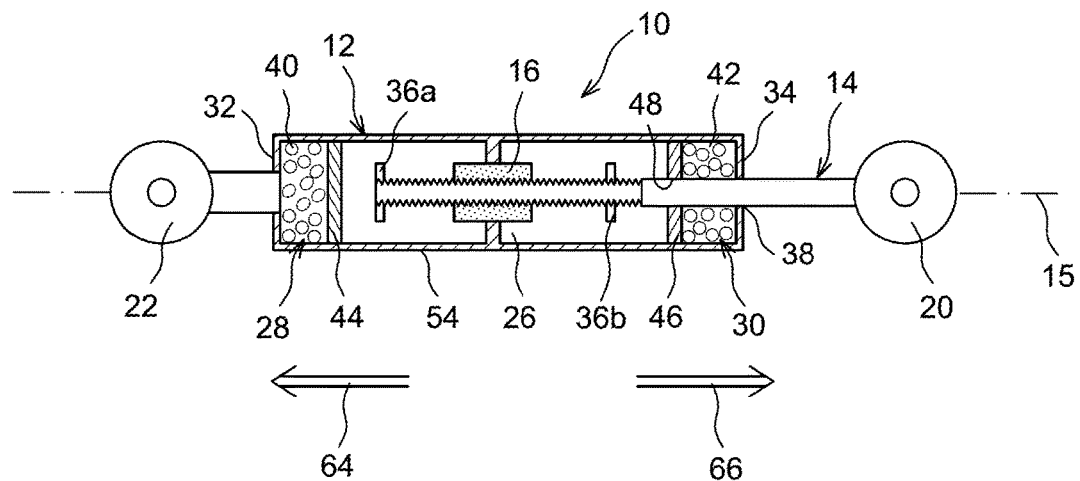
FIG. 3 is a schematic axial cross-section view of an electromechanical actuator according to a second embodiment of the invention.

FIG. 3 represents an electromechanical actuator 10 according to a second embodiment of the invention.

This actuator differs from the actuator of FIG. 1 in that the cavity 26 is not defined in a hollow body which is independent from the frame 12 and part of the connecting means 20. Indeed, this cavity 26 is herein defined inside a hollow body 54 making part of the frame 12 of the actuator, and the driving unit 16 of the movable member 14 is fixedly accommodated inside this cavity 26.

In this second embodiment, the movable member 14 carries two plates 36a and 36b arranged on either side of the driving unit 16, each facing a corresponding energy absorbing-dissipating structure 28, 30, these two plates 36a and 36b forming strain transmitting means much like the plate 36 of FIG. 1.

Thus, when the movable member 14 undergoes strains induced by the first element to which this movable member 14 is connected, the same can be moved at the end of its stroke if these strains are of a sufficient level, such that one of the plates 36a and 36b can contact the corresponding energy absorbing-dissipating structure 28, 30.

The level of the aforementioned strains is thus restricted to a value substantially equal to that of the first pressure level P1, analogously to what has been explained above, except that the movable member 14 has to be moved at the end of its stroke before the energy absorbing-dissipating structures go into action. In other words, if the strains applied to the movable member 14 by the first element do not enable this movable member 14 to be brought to the end of its stroke, given the power and the response time of the driving unit 16, then, the energy absorbing-dissipating structures 28 and 30 do not go into action. These structures are therefore in this case used as mechanical stroke-end stops.

Figure 4:
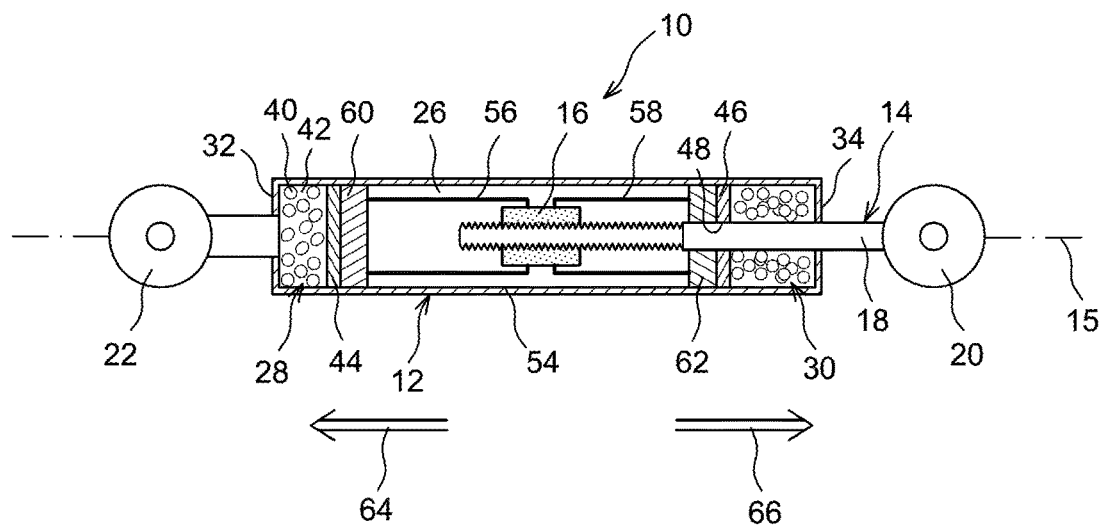
FIG. 4 is a schematic axial cross-section view of an electromechanical actuator according to a third embodiment of the invention.

FIG. 4 represents an electromechanical actuator 10 according to a third embodiment of the invention, wherein the driving unit 16 is not fixed with respect to the frame 12 but is supported inside the cavity 26 of the body 54 of the frame by means of both energy absorbing-dissipating structures 28 and 30.

More precisely, the actuator 10 comprises two supporting structures 56 and 58 axially provided on each side of the driving unit 16 and each connected to this driving unit 16 and to a corresponding plate 60, 62 which is slidingly mounted in the cavity 26 of the hollow body 54 of the frame 12 and which is applied against the sealing element 44, 46 bounding the deformable chamber of the corresponding energy absorbing-dissipating structure 28, 30.

Thus, the driving unit 16 is longitudinally kept in position by both energy absorbing-dissipating structures 28, 30 and by the aforementioned supporting structures 56 and 58.

It is worth of note that the plates 60 and 62 form strain transmitting means much like the plates 36, 36a, 36b of FIGS. 1 and 3.

When strains along the axis 15 of the actuator are imparted by the first element to the movable member 14 and then by the latter to the driving unit 16, the driving unit can transmit these strains via the corresponding plate 60 or 62 to the corresponding energy absorbing-dissipating structure 28 or 30 which acts then as a strain limiter in the manner explained above.

It is to be noted that the sealing element 44, 46 of each energy absorbing-dissipating structure 28, 30 of the actuators 10 according to the second and third embodiments described above can also assume different shapings among which for example that represented in FIG. 2.

In all the three embodiments described above, the energy absorbing-dissipating structures 28, 30 are each arranged on a strain path between the first element, connected to the movable member 14, and the frame 12 of the actuator, so as to be able to be biased by the strain transmitting means 36, 36a, 36b, 60, 62 along the longitudinal direction in two respective opposite directions, symbolized by the arrows 64 and 66 (FIGS. 1, 3 and 4).

Generally, the actuator 10 according to the invention has relatively reduced overall size and weight while being capable of supporting relatively intense strains, thanks to the effect of strain limitation produced by the energy absorbing-dissipating structures integrated to this actuator.

The actuator 10 according to the first embodiment of the invention described above in reference to FIG. 1 can be of a particularly reduced overall size because the energy absorbing-dissipating structures of this actuator are not provided in the frame 12 thereof but in the connecting means 20 mounted on the movable member 14 and independent from the frame 12.

Given that the energy absorbing-dissipating structures of this actuator 10 are permanently in the strain line, regardless of the stroke of the movable member 14, stresses applied to the driving unit 16 by the movable member 14 can be optimally minimized.

However, this makes desirable that the dynamic behaviour of the energy absorbing-dissipating structures is determined with the highest possible accuracy because these structures change the global dynamics of the actuator. But, these structures should not impact the operation and the driving of the actuator in nominal mode, that is in the absence of high transitory strains.

Generally, the actuator 10 according to the invention is preferably dimensioned such that the level of strains applied thereto in nominal mode, in particular in a flight phase, does not exceed the intrusion pressure level P1. Under these conditions, the colloid of each energy absorbing-dissipating structure dynamically behaves as the liquid making it up, which is preferably almost incompressible. In this case, the energy absorbing-dissipating structures, however being systematically applied in series on the strain path of the actuator, therefore do not disturb the dynamics of the driving of this actuator in nominal mode.

The actuator 10 according to the second embodiment of the invention has the advantage that the energy absorbing-dissipating structures only act when the movable member 14 comes at the end of its stroke, such that the presence of these structures does not change the behaviour of the actuator in nominal operation.

This can be advantageous in particular if the energy absorbing-dissipating structures comprise a compressible liquid such as an oil.

Furthermore, the accurate knowledge of the dynamic behaviour of the energy absorbing-dissipating structures appears of secondary importance in this case.

Figure 5:
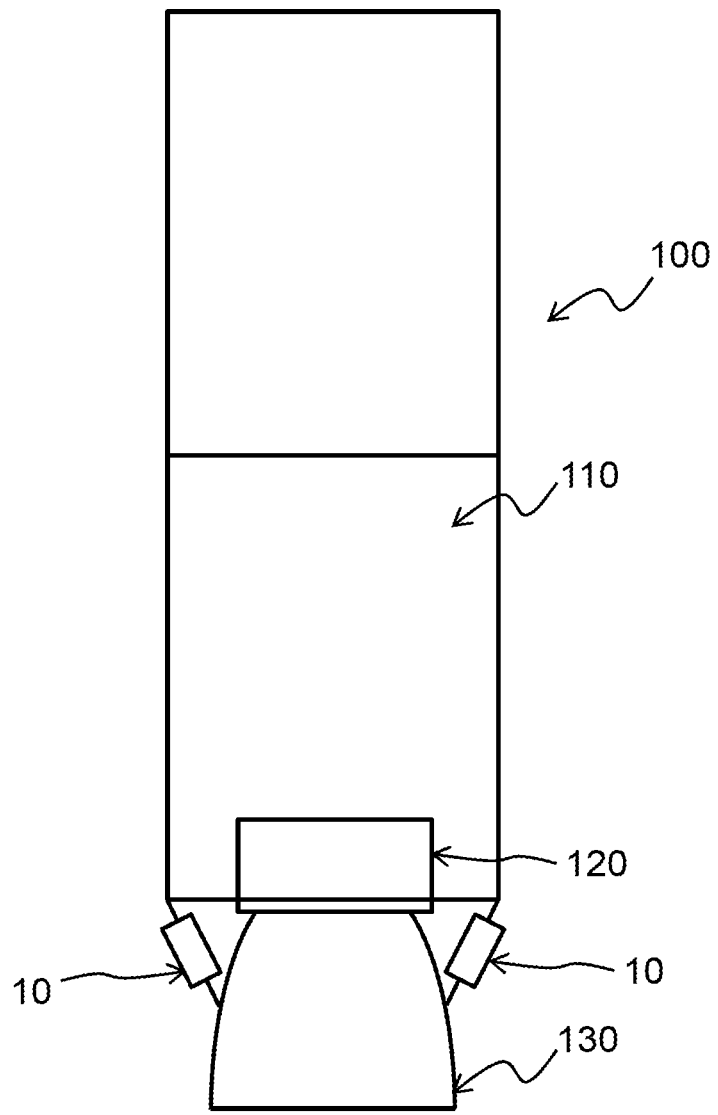
FIG. 5 is a schematic view of a space launcher according to a preferred embodiment of the invention.

FIG. 5 illustrates a space launcher 100 comprising a stage 110 which comprises an engine 120 including a jet nozzle 130 as well as two electromechanical actuator 10 of the type described above to provide the support and steering of the j et nozzle 130.

What is claimed is:

1. An electromechanical actuator, for moving a first element with respect to a second element, the actuator comprising:
    a movable member (14) provided with connecting means for being attached to said first element,
    a frame provided with attaching means for being attached to said second element,
    a driving unit which drives the movable member in translation relative to said frame, and
    at least one mechanical energy absorbing-dissipating structure located on a strain path between said first element and a surface of said frame of the actuator, said at least one mechanical energy absorbing-dissipating structure comprising:
        a deformable chamber containing at least one porous capillary matrix having open pores and an associated liquid having a wetting angle higher than 90 degrees relative to said matrix and selected such that at least part of said liquid penetrates the pores of said matrix, when an external mechanical pressure applied to the chamber is equal to or higher than a first pressure level PI, and is spontaneously rejected off the pores of said matrix by capillary action, when said external mechanical pressure applied to the chamber is lower than a second pressure level P2 which is lower than said first pressure level P1 such that the at least one energy absorbing-dissipating structure limits a level of strains which may be transmitted to the frame of the electromechanical actuator by the first element via the movable member of the electromechanical actuator,
    wherein said movable member is in said strain path and said external mechanical pressure applied to said deformable chamber is a sum of forces applied to said movable member by said driving unit and an external strain applied to said first element.

2. The actuator according to claim 1, wherein the at least one energy absorbing-dissipating structure of the actuator is accommodated inside a cavity through which said movable member of the actuator passes at least partly, and is interposed between a wall of said cavity and strain transmitting means which are configured to exert a pressure against the deformable chamber of said at least one energy absorbing-dissipating structure for transmitting strains between said first element and said frame of the actuator.

3. The actuator according to claim 2, wherein said strain transmitting means are carried by said movable member.

4. The actuator according to claim 3, wherein said connecting means (20) of said movable member (14) to said first element comprise a hollow body (24) slidingly mounted on said movable member (14) and inside which said cavity (26) is provided.

5. The actuator according to claim 3, wherein said frame comprises a hollow body inside which said cavity is provided and wherein the driving unit for driving said movable member is fixedly accommodated in said cavity.

6. The actuator according to claim 5, wherein said strain transmitting means comprise one or more plates respectively cooperating with the at least one energy absorbing-dissipating structure and each arranged between said driving unit and said corresponding energy absorbing-dissipating structure.

7. The actuator according to claim 2, wherein said frame (12) comprises a hollow body (54) inside which said cavity (26) is provided, and wherein said strain transmitting means (60, 62) aid in supporting the driving unit (16) for driving said movable member (14) inside said cavity (26).

8. The actuator according to claim 2, further comprising a second mechanical energy absorbing-dissipating structures located on a respective strain path between said first element and the surface of said frame of the actuator and comprising a second deformable chamber containing at least one porous capillary matrix having open pores and an associated liquid having a wetting angle higher than 90 degrees relative to said matrix and selected such that at least part of said liquid penetrates the pores of said matrix, when a second external mechanical pressure applied to said second chamber is higher than a third pressure level P3, and is spontaneously rejected off the pores of said matrix by capillary action, when said second external mechanical pressure applied to said second chamber is lower than a fourth pressure level P4 which is lower than said third pressure level P3, said at least one energy absorbing-dissipating structure and said second mechanical energy absorbing-dissipating structure being provided on either side of said strain transmitting means such that said first element can bias said structures in two respective opposite directions.

9. The actuator according to claim 1, wherein the force applied by the driving unit is zero.

10. An engine for a space launcher, including
    at least one jet nozzle, and
    at least one electromechanical actuator for moving a first element with respect to a second element, said at least one electromechanical actuator comprising:
        a movable member (14) provided with connecting means for being attached to said first element,
        a frame provided with attaching means for being attached to said second element, wherein said movable member is translationally movable with respect to said frame,
        a driving unit which drives the movable member in translation, and at least one mechanical energy absorbing-dissipating structure located on a strain path between said first element and said frame of the actuator, said at least one mechanical energy absorbing-dissipating structure comprising:
  a deformable chamber containing at least one porous capillary matrix having open pores and an associated liquid having a wetting angle higher than 90 degrees relative to said matrix and selected such that at least part of said liquid penetrates the pores of said matrix, when an external mechanical pressure applied to the chamber is equal to or higher than a first pressure level PI, and is spontaneously rejected off the pores of said matrix by capillary action, when said external mechanical pressure applied to the chamber is lower than a second pressure level P2 which is lower than said first pressure level P1 such that the at least one energy absorbing-dissipating structure limits a level of strains which may be transmitted to the frame of the electromechanical actuator by the first element via the movable member of the electromechanical actuator,
  wherein said movable member is in said strain path and said external mechanical pressure applied to said deformable chamber is a sum of forces applied to said movable member by said driving unit and an external strain applied to said first element.

11. The engine according to claim 10, wherein the force applied by the driving unit is zero.

12. A space launcher, comprising at least one engine including:
  at least one jet nozzle, and
  at least one electromechanical actuator for moving a first element with respect to a second element, the at least one electromechanical actuator comprising:
    a movable member provided with connecting means for being attached to said first element,
    a frame provided with attaching means for being attached to said second element, wherein said movable member is translationally movable with respect to said frame,
    a driving unit which drives the movable member in translation, wherein said actuator; and
    at least one mechanical energy absorbing-dissipating structure located on a strain path between said first element and said frame of the actuator, the at least one mechanical energy absorbing-dissipating structure comprising
      a deformable chamber containing at least one porous capillary matrix having open pores and an associated liquid having a wetting angle higher than 90 degrees relative to said matrix and selected such that at least part of said liquid penetrates the pores of said matrix, when an external mechanical pressure applied to the chamber is equal to or higher than a first pressure level PI, and is spontaneously rejected off the pores of said matrix by capillary action, when said external mechanical pressure applied to the chamber is lower than a second pressure level P2 which is lower than said first pressure level P1 such that the at least one energy absorbing-dissipating structure limits a level of strains which may be transmitted to the frame of the electromechanical actuator by the first element via the movable member of the electromechanical actuator,
    wherein said movable member is in said strain path and said external mechanical pressure applied to said deformable chamber is a sum of forces applied to said movable member by said driving unit and an external strain applied to said first element.

13. The space launcher according to claim 12, wherein the force applied by the driving unit is zero.

* * * * *

UNITED STATES PATENT AND TRADEMARK OFFICE
CERTIFICATE OF CORRECTION

| | | |
|---|---|---|
| PATENT NO. | : 10,094,441 B2 | Page 1 of 1 |
| APPLICATION NO. | : 14/351584 | |
| DATED | : October 9, 2018 | |
| INVENTOR(S) | : Thierry Abensur et al. | |

It is certified that error appears in the above-identified patent and that said Letters Patent is hereby corrected as shown below:

In the Specification

Column 9, Lines 29 to 30:
"steering of the j et nozzle"

Should read:
-- steering of the jet nozzle --

In the Claims

Claim 4, Column 10, Line 13:
"means (20) of said moveable member (14)"

Should read:
-- means of said moveable member --

Claim 7, Column 10, Lines 27-31:
"frame (12) comprises a hollow body (54) inside which said cavity (26) is provided, and wherein said strain transmitting means (60, 62) aid in supporting the driving unit (16) for driving said movable member (14) inside said cavity (26)."

Should read:
-- frame comprises a hollow body inside which said cavity is provided, and wherein said strain transmitting means aid in supporting the driving unit for driving said movable member inside said cavity. --

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*